United States Patent [19]

Fujiwara et al.

[11] Patent Number: 4,813,078
[45] Date of Patent: Mar. 14, 1989

[54] CHARACTER RECOGNITION APPARATUS

[75] Inventors: Akie Fujiwara, Moriguchi; Mariko Takenouchi, Ibaraki; Masahiro Shimizu, Katano, all of Japan

[73] Assignee: Matsushita Electric Industrial Co., Ltd., Kadoma, Japan

[21] Appl. No.: 188,624

[22] Filed: Apr. 29, 1988

Related U.S. Application Data

[63] Continuation of Ser. No. 829,992, Feb. 18, 1986, abandoned.

[30] Foreign Application Priority Data

Feb. 15, 1985 [JP] Japan .................................. 60-28655

[51] Int. Cl.$^4$ .............................................. G06K 9/48
[52] U.S. Cl. ......................................... 382/21; 382/18
[58] Field of Search .................. 382/9, 10, 16, 18–23, 382/25, 40, 51, 56; 358/166, 263, 282, 284

[56] References Cited

U.S. PATENT DOCUMENTS

| | | | |
|---|---|---|---|
| 3,755,780 | 8/1973 | Sammon et al. | 382/21 |
| 3,968,475 | 7/1976 | McMahon | 382/18 |
| 4,087,788 | 5/1978 | Johannesson | 382/56 |
| 4,295,120 | 10/1981 | Yoshida | 382/18 |
| 4,326,190 | 4/1982 | Borland et al. | 382/21 |

Primary Examiner—Leo H. Boudreau
Assistant Examiner—Jose L. Couso
Attorney, Agent, or Firm—Wenderoth, Lind & Ponack

[57] ABSTRACT

A character recognition apparatus is arranged such that: a character pattern is extracted as a rectangle from the inputted picture image data; the number of picture element points corresponding to the direction code of the boundary point of the character portion is provided as the boundary direction density for each region of the recognition object character pattern for each sub-region provided by the division of character pattern; the scanning operation is performed with respect to the side opposite respectively from four sides of the extracted rectangle; the picture element point which changes from the background to the character portion is defined as a change point; the picture element string number is increased by one each time the change point is detected so as to add the picture string number to each picture element; the number of the picture element point corresponding to the picture element string number is provided as the background density for each region of the recognition object character pattern for each sub-region to be divided; the character recognition is performed using the boundary direction density for each region and the background density for each region.

8 Claims, 8 Drawing Sheets

Fig. 2(a)
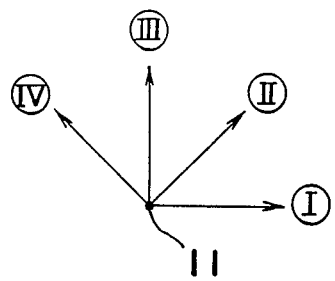
Fig. 2(b)
Fig. 2(c)
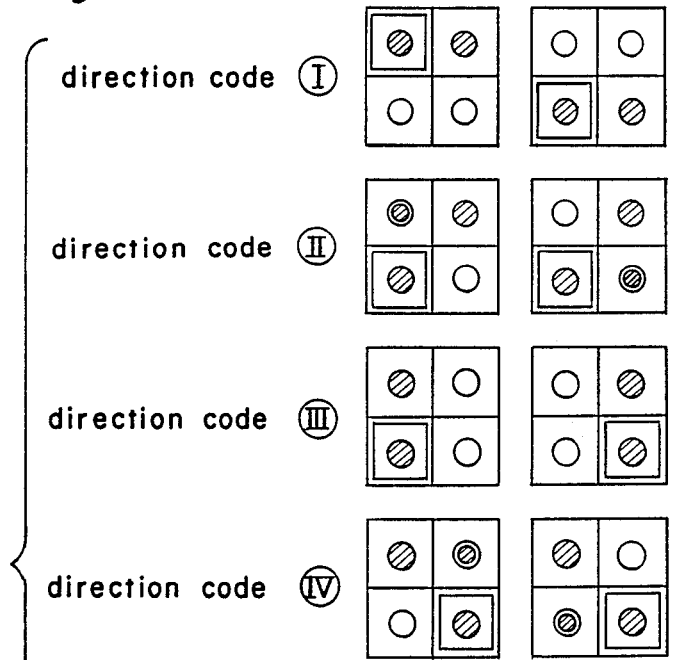
 : character portion
 : background portion
 : character or background portion
 : boundary point (character portion)

Fig. 6
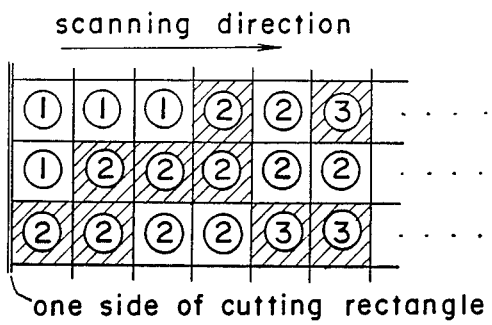
□ : background portion
▨ : character portion
①
②  picture element string number
③
Fig. 7(a)  Fig. 7(b)
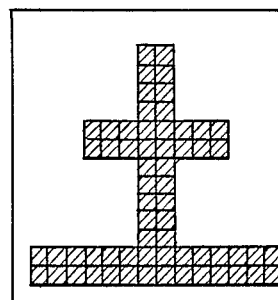 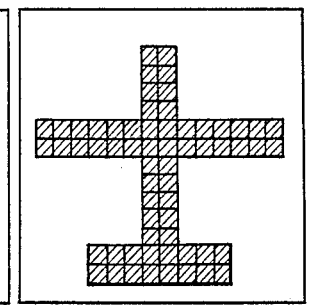
Fig. 8(a)  Fig. 8(b)
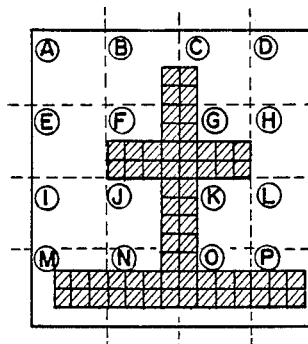 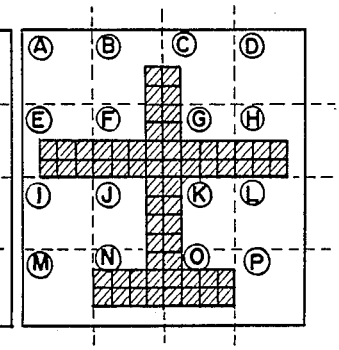

Fig. 9(a)

| sub-region \ direction code | I | II | III | IV |
|---|---|---|---|---|
| Ⓐ | 0 | 0 | 0 | 0 |
| Ⓑ | 1 | 0 | 1 | 0 |
| Ⓒ | 0 | 0 | 1 | 0 |
| Ⓓ | 0 | 0 | 0 | 0 |
| Ⓔ | 0 | 0 | 0 | 0 |
| Ⓕ | 4 | 1 | 3 | 0 |
| Ⓖ | 4 | 0 | 3 | 0 |
| Ⓗ | 0 | 0 | 0 | 1 |
| Ⓘ | 0 | 0 | 0 | 0 |
| Ⓙ | 0 | 0 | 3 | 1 |
| Ⓚ | 0 | 1 | 3 | 0 |
| Ⓛ | 0 | 0 | 0 | 0 |
| Ⓜ | 6 | 0 | 1 | 0 |
| Ⓝ | 6 | 1 | 1 | 0 |
| Ⓞ | 7 | 0 | 1 | 1 |
| Ⓟ | 6 | 0 | 1 | 0 |

Fig. 9(b)

| sub-region \ direction code | I | II | III | IV |
|---|---|---|---|---|
| Ⓐ | 0 | 0 | 0 | 0 |
| Ⓑ | 1 | 0 | 1 | 0 |
| Ⓒ | 0 | 0 | 1 | 0 |
| Ⓓ | 0 | 0 | 0 | 0 |
| Ⓔ | 6 | 0 | 1 | 0 |
| Ⓕ | 4 | 1 | 2 | 0 |
| Ⓖ | 6 | 0 | 2 | 1 |
| Ⓗ | 4 | 0 | 1 | 0 |
| Ⓘ | 0 | 0 | 0 | 0 |
| Ⓙ | 0 | 0 | 3 | 1 |
| Ⓚ | 0 | 1 | 3 | 0 |
| Ⓛ | 0 | 0 | 0 | 0 |
| Ⓜ | 0 | 0 | 0 | 0 |
| Ⓝ | 6 | 1 | 2 | 0 |
| Ⓞ | 5 | 0 | 2 | 1 |
| Ⓟ | 0 | 0 | 0 | 0 |

Fig. 10 (a)

| sub-region / picture element string number | 0 | 1 |
|---|---|---|
| Ⓐ | 16 | 0 |
| Ⓑ | 14 | 2 |
| Ⓒ | 8 | 8 |
| Ⓓ | 8 | 8 |
| Ⓔ | 16 | 0 |
| Ⓕ | 6 | 10 |
| Ⓖ | 0 | 16 |
| Ⓗ | 0 | 16 |
| Ⓘ | 16 | 0 |
| Ⓙ | 12 | 4 |
| Ⓚ | 0 | 16 |
| Ⓛ | 0 | 16 |
| Ⓜ | 10 | 6 |
| Ⓝ | 7 | 9 |
| Ⓞ | 4 | 12 |
| Ⓟ | 4 | 12 |

Fig. 10 (b)

| sub-region / picture element string number | 0 | 1 |
|---|---|---|
| Ⓐ | 16 | 0 |
| Ⓑ | 14 | 2 |
| Ⓒ | 8 | 8 |
| Ⓓ | 8 | 8 |
| Ⓔ | 10 | 6 |
| Ⓕ | 6 | 10 |
| Ⓖ | 0 | 16 |
| Ⓗ | 0 | 16 |
| Ⓘ | 16 | 0 |
| Ⓙ | 12 | 4 |
| Ⓚ | 0 | 16 |
| Ⓛ | 0 | 16 |
| Ⓜ | 16 | 0 |
| Ⓝ | 7 | 9 |
| Ⓞ | 4 | 12 |
| Ⓟ | 4 | 12 |

CHARACTER RECOGNITION APPARATUS

This application is a continuation of now abandoned Ser. No. 829,992, filed Feb. 18, 1986.

BACKGROUND OF THE INVENTION

The present invention relates to a character recognition apparatus which recognizes the types of newspapers, magazine or the like, and the hand-written characters so as to convert them into the character codes.

Conventionally, in a character recognition apparatus, a system is adopted for extracting the recognition object character from the image data inputted from a scanner or the like, and obtaining the features of the recognition object character, and obtaining the distance between the features of a recognition candidate character group registered in advance and the features of the recognition object character so as to have, as a recognition result, the closest character from among the recognition candidate character group.

The construction of the conventional example is shown in FIG. 11. The picture image provided through the scanning of the manuscript from the scanner 21, which is also referred to as an image input portion, is stored in the picture image memory portion 22. In the character extracting portion 23, the recognition object character pattern is extracted as a rectangle from the picture image data stored in the picture image memory portion 22. In the direction code designating portion 24, when the polarity of the picture element point of the recognition object character pattern is different from the polarity of at least one of eight picture points adjacent to the picture element point, the picture element point is considered as a boundary point, and the direction code of the boundary point 11 is determined through its relationship with the picture element point adjacent to such a boundary point 11 as shown in FIG. 2(b), the number of the boundary points corresponding to each direction code is obtained as the features showing the boundary direction density of the character.

In the recognition portion 25, the distance between the features of the recognition object character obtained by the direction code granting portion 24 and the features of the recognition candidate character group registered in advance in the dictionary 26 is calculated, and the character closest in the distance in the recognition candidate character group is the recognition result.

In the conventional example, the boundary direction density of the recognition object character "+" shown in FIG. 7(a) and the boundary direction density of the recognition object character "+" shown in FIG. 7(b) agree as in FIG. 12 so as to cause an erroneous recognition.

SUMMARY OF THE INVENTION

Accordingly, an object of the present invention is to provide a character recognition apparatus which is capable of correctly recognizing even characters which are similar in shape.

To achieve the above object, the present invention provides a character recognition apparatus for performing recognition through the joint use of the direction density and the background density , and which is provided with a picture image input portion for inputting the picture images including the recognition object characters, a picture image memory portion for storing the inputted picture images, a character extracting portion for extracting the recognition object character region from the picture image memory portion, a direction code designating portion for designating the direction code of the picture element point of the recognition object character region through its relationship with picture element points adjacent to the picture element point, a direction density calculating portion for obtaining the number of picture element points corresponding to the direction code by the use of the direction code of the picture element point obtained by the direction code granting portion, a change point detection portion for detecting, as a change point, a picture element point which changes into a character portion from a background portion when the region extracted by the character extracting portion has been scanned from at least one direction, a background density calculating portion for calculating, for each sequence that the change points are detected, the number of the picture elements until the change points are sequentially detected with respect to the scanning direction in the change point detecting portion, a recognition portion for recognizing the candidate character using the number of picture element points obtained by the direction density calculating portion and the number of the picture element points obtained by the background density calculating portion.

According to the present invention, the correct recognition may be performed with respect to the characters similar in shape such as "+", "+" which conventionally cause recognition errors.

Furthermore, the recognition object character region is divided into a plurality of sub-regions to calculate the region-separation direction density and the region-separation background density for each sub-region so that the correct recognition may be performed even for similar characters which are only partially different.

Also, the sub-region used in obtaining the direction density for each region and the sub-region used in obtaining the background density for each region are made the same in the division region so that the processing of the sub-region division may be simplified.

The extracting of the recognition object character region through the rectangle by the character extracting portion and the division of the recognition object character region into horizontal and vertical directions so as to determine the sub-region enable the region to be simply expressed and enable the region to be simplified.

The direction code may be obtained in the boundary point where the polarity of the picture element point of the character pattern of the recognition object character region is different from the polarity of at least one picture element point selected among the picture element points adjacent to the picture element point so that the processing of the picture element point except for the boundary point is simplified and the direction density for each region may be calculated stably independently of the thickness of the character.

The change point is detected through the recognition object region from four directions, by the change point detecting portion so that characters similar in shape may be recognized correctly by simple processing.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 2(a)-2(c) are illustration views of how to obtain the direction code of the boundary point of the character;

FIG. 6 is a view for illustrating how to obtain the picture element string number;

FIGS. 7(a)-7(b) are pattern views showing the recognition exercise characters "+", "+";

FIGS. 8(a)-8(b) are pattern views, in which the "+", "+" in accordance with one example of the present invention are divided into the sub-region;

FIGS. 9(a)-9(b) are corresponding charts showing the number of the boundary points corresponding to each direction code for each sub-region of the "+", "+" in the embodiment;

FIGS. 10(a)-10(b) are corresponding charts showing the number of the picture elements corresponding to each picture element string number for each sub-region of the "+", "+" in the embodiment;

DETAILED DESCRIPTION OF THE INVENTION

Figure 1:
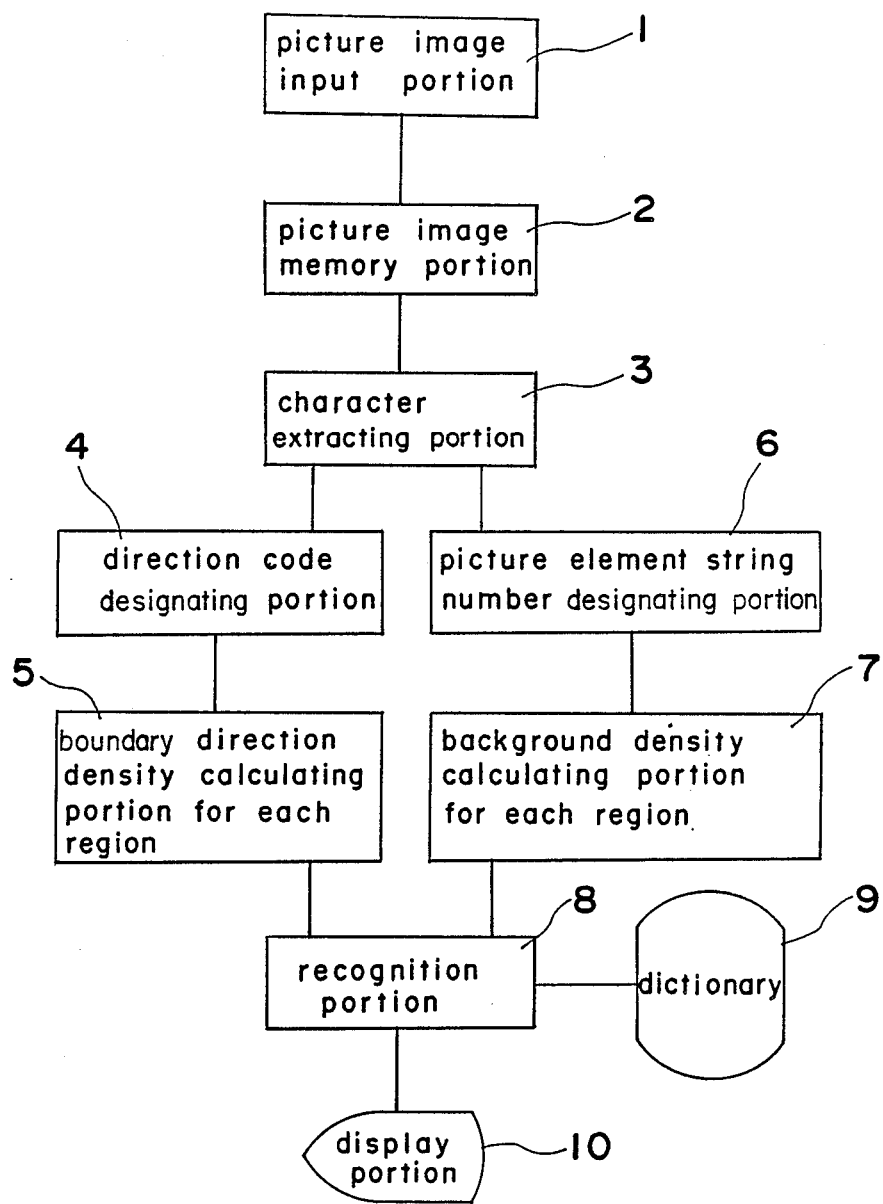
FIG. 1 is a block diagram of a character recognition apparatus in accordance with one example of the present invention.

Before the description of the present invention proceeds, it is to be noted that like parts are designated by like reference numerals throughout the accompanying drawings.

Referring now to FIG. 1, there is shown a construction view in one embodiment of a character recognition apparatus in accordance with the present invention. A picture image input portion 1 inputs images including recognition object charaters and stores the inputted images in a picture image memory portion 2. A character extracting portion 3 extracts a recognition object letter pattern in a rectangular form from the picture image memory portion 2. A direction code designating portion 4 designates the picture element point as a boundary point when the polarity of the image element point of the recognition object character pattern which has been extracted by the character extracting portion 3 is different from the polarity of the picture element point of at least one picture element point selected from among eight picture element points adjacent to the picture element point; the direction code of the boundary point is determined by the relationship with eight picture element points adjacent to such a boundary point as shown in FIGS. 2(a) and 2(c). A boundary direction density calculating portion for each region 5 obtains the number of boundary points corresponding to each direction code using direction code of the boundary points provided by the direction code designating portion 4 for each sub-region of M×N wherein the rectangle extracted by the character extracting portion 3 is M-divided in the horizontal direction, and is N-divided in the vertical direction. A picture-element string number granting portion 6 scans with respect to the respectively facing sides from four sides, top, bottom, right, left of the extracted rectangle provided by the character extracting portion 3. When the picture element point which changes from the background portion to the character portion of the recognition object character has been detected is as shown in FIG. 6, the picture element is regarded as a change point, and the picture-element string number which is the number of the group to which the picture element point belongs is increased by one so as to serve as the picture element string number of the picture element point. In the case of the picture element points other than change points, a picture element string number which is the same as that of a picture element point of the previous picture element point is provided. A background density calculating portion for each region 7 obtains the number of picture element points corresponding to each picture-element string number using the picture-element string number of the picture element points provided by the picture-element string number designating portion 6 for each sub-region of P×Q, wherein the rectangle extracted by the character extracting portion 3 is P-divided in the horizontal direction, and is Q-divided in the vertical direction. A recognition portion 8 respectively obtains features showing the boundary direction density of the character provided from the boundary direction density calculating portion for each region 5, and the features showing the background density of the character obtained from the background density calculating portion for each region 7, and the features showing the boundary direction density of all of the characters which become objects of recognition stored in the dictionary 9, and the similarity to the features showing the background density so as to extract the high similarity characters as a recognition result. A display portion 10 shows the recognition result extracted by the recognition portion 8.

Figure 3:
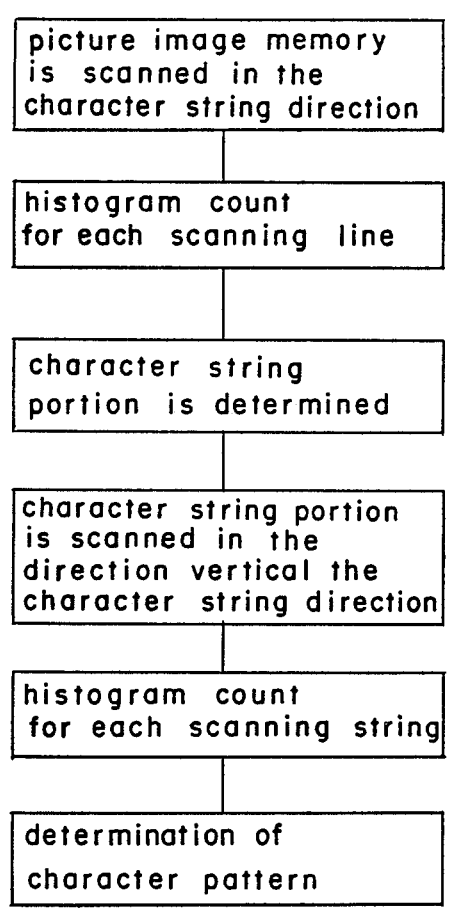
FIG. 3 is a chart for illustrating the character extracting flow.

The processing flow of a character extracting portion 3 of one embodiment of the present invention is shown in FIG. 3.

Image data stored in the picture image memory 2 are scanned in the character string direction, and the histogram for each scan line is counted; the start position is an n picture element or more in the value of the histogram and the completion position are used to determine the character string portion; the string portion character is further scanned vertically in the character string direction to count the histogram for each scan string so as to detect the start portion of the character pattern portion and the completion position which is an m picture element or more in the value of the histogram is used to determine the character pattern so as to extract the recognition object character pattern.

Figure 4:
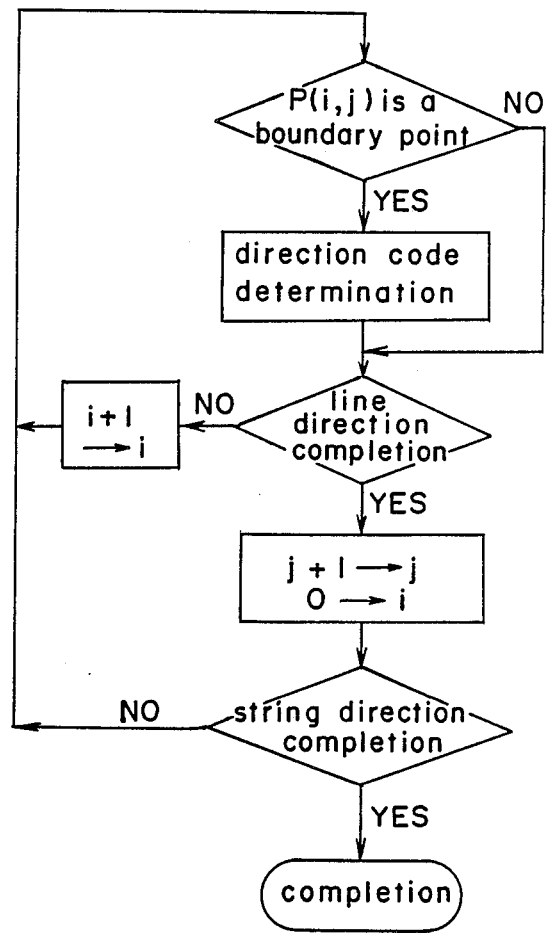
FIG. 4 is a chart for illustrating the direction code designating flow.

The processing flow of the direction code designating portion 4 in one embodiment of the present invention is shown in FIG. 4.

When the polarity of the picture element point P(i, j) of the recognition object character pattern extracted by the character extracting portion 3 is different from the polarity of at least one pictue element point selected from among 8 picture element points adjacent to the picture element point, as shown in FIG. 2(b), P(i−1, j−1), P(i−1, j), P(i−1, j+1), P(i, j−1), P(i, J+1), P(i+1, j−1), Pi+1, j), P(i+1, j+1), the picture element point is designated as a boundary point. The direction code of the picture element point is determined from its relationship with the eight picture element points adjacent to the boundary point as shown in FIG.

2(c). This is executed about all picture elements of the recognition object character pattern.

In the boundary direction density calculating portion for each region 5, the rectangle extracted by the character extracting portion 3 is M-divided in the horizontal direction, and is N-divided in the vertical direction. The number of the boundary points is obtained, for each sub-region of the M×N, in accordance with each direction code by the use of the direction code of each picture element point of the recognition object character pattern provided by the direction code granting portion 4.

Figure 5:
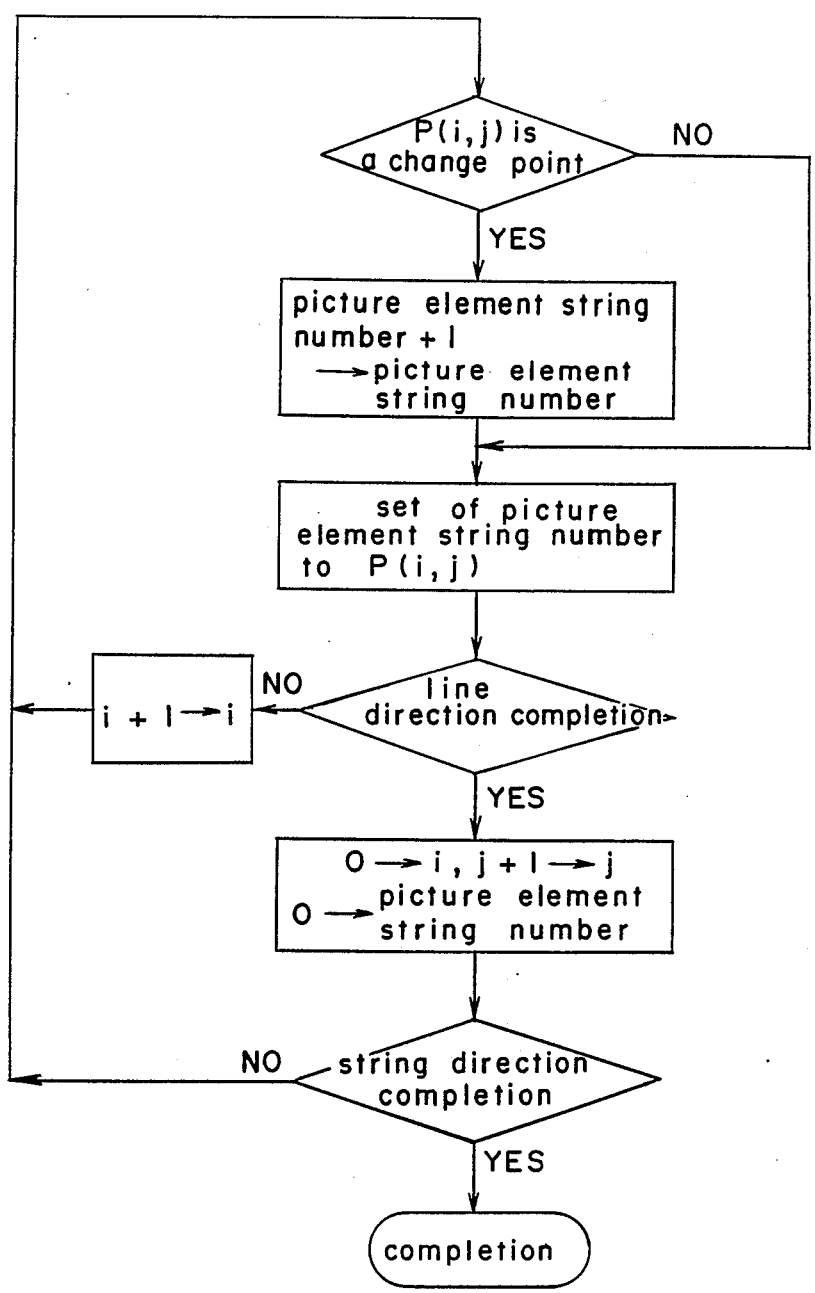
FIG. 5 is a chart for illustrating the picture element string number designating flow.
Figures 11, 12:
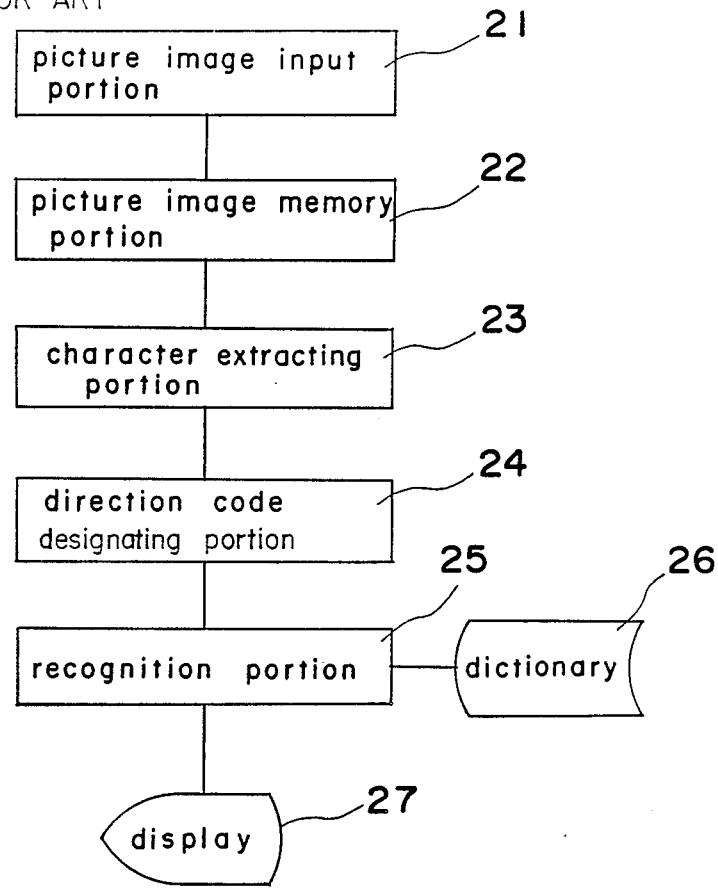
FIG. 11 is a block diagram of a character recognition apparatus of a convention system.
FIG. 12 is a view showing the boundary direction density of the character pattern shown in FIGS. 7(a)-7(b) obtained by the conventional system.

The process flow of the picture element string number granting portion 6 is shown in FIG. 5. The scanning operation is performed with respect to the side opposite from the left-hand side of the extracting rectangle provided by the character extracting portion 3. As shown in FIG. 6, the picture element point which changes into the character portion from the background portion of the recognition object character is detected to determine the picture element point as a change point. The picture element string number which is a group number to which the picture element point belongs is increased by one so as to have the picture element string number of the picture element point. When it is not a change point, a picture element string number of the previous picture element point is designated. A similar processing is further performed from the top side, the right side, the bottom side.

In the background density calculating portion for each region 7, the rectangle extracted by the character extracting portion 3 is P-divided in the horizontal direction, and is Q-divided in the vertical direction. The number of picture elements corresponding to each picture element string number is obtained, for each sub-region of P×Q, by using the picture element string number of each picture element point in the respective scanning from the left side, the top side, the right side, and the bottom side obtained from the picture element string number designating portion 6.

In the recognition portion 8, with the factors of features Ck (k=1, 2, ... K) expressing the boundary direction density of the character obtained by the direction density calculating portion for each region 5 and features Bl (l=1, 2, ... L) expressing the background density of the character obtained by the background density calculating portion for each region 7, the boundary direction density $\overline{C}tk$ background density $\overline{B}tl$ (t=1, 2, ... T) of the t-th recognition candidate character stored in the dictionary 9 in advance, the distance Dt with respect to Ck and Bl in connection with $\overline{C}tk$ and $\overline{B}tl$ is obtained by the following equation:

$$Dt = \sum_{k=1}^{K} |Ck - \overline{C}tk| + \sum_{l=1}^{L} |Bl - \overline{B}tl|$$

Furthermore, Dt is obtained for t=1, 2, ... T, and the smallest value Ds in the Dt is extracted so that the S-th character becomes the recognition result.

The recognition example characters "┼", "┼" will be described by way of example about the operation of the character recognition apparatus constructed as described hereinabove.

In the picture image input portion 1, the recognition example characters "┼", "┼" are digitized and are stored in the picture image memory portion 2. In the character extracting portion 3, the rectangle patterns R shown in FIGS. 7(a)–7(b) are extracted as recognition object character patterns for the two respective characters from the picture image memory portion 2. In the direction code designating portion 4, the direction codes of all of the boundary points of the recognition object character pattern are decided in accordance with the conditions of FIGS. 2(a)–2(d). In the boundary direction density calculating portion for each region 5, the number of the boundary points corresponding to each direction code are obtained using the direction code of the boundary point obtained in the direction code designating portion 4 in each sub-region of sixteen 4-divided (M=4) in the horizontal direction, and 4-divided (N=4) in the vertical direction shown by the Ⓐ·Ⓑ·Ⓒ ... ... Ⓟ of FIGS. 8(a)–8(b). The values shown in FIGS. 9(a) and 9(b) are the respective numbers of the boundary points corresponding to each direction code in each sub-region of the sixteen of the recognition object character patterns respectively shown in FIGS. 7(a)–7(b) and are the features showing the boundary direction density of the recognition example characters "┼", "┼". In the picture element string number designating portion 6, the scanning operation is performed with respect to the respective opposite sides from the top, bottom, right, left of the rectangle R shown in FIGS. 7(a)–7(b) to determine the picture element string number for each scanning operation of all of the picture element points in the recognition object character pattern in accordance with the conditions shown in FIG. 6. In the background density calculating portion for each region 7, the number of picture element points corresponding to each picture element string number in each sub-region is obtained using the picture element string number of each picture element point obtained by the picture element string number granting portion 6. The values shown in FIGS. 10(a)–10(b) are the respective number of picture elements corresponding to each picture element string number in each sub-region of the sixteen in a case where the recognition object character patterns respectively shown in FIGS. 7(a)–7(b) have been scanned from the left side. Similarly, the scanning operation is performed from each side of the top, bottom, right to provide the features showing the background density of the recognition example characters "┼", "┼". The dictionary 9 stores, for all of the recognition candidate characters, the features showing the boundary direction density and the features showing the background density. In the recognition portion 8, the similarity is respectively obtained between the the recognition example characters "┼", "┼" and the characters within the dictionary 9 about the features on the boundary direction density and the background density to extract the most similar character as a recognition result. In the display portion 10, the recognition result is displayed.

In the present embodiment, the number of picture element points corresponding to all of the picture element string numbers is obtained for all of the sub-regions of the recognition object character pattern. Needless to say, the number of the picture element points corresponding to the restricted picture element string number in the restricted sub-region may be used as the features in recognizing. Also, in the present embodiment, the picture element point which changes into the character portion from the background portion has been detected as a change point when the respective scanning operations have been performd from the left side, the top side, the right side and the bottom side in the horizontal and vertical directions in the picture element string number designating portion 6 as one embodiment of the change-point detecting portion, but the direction of the change point detection is not restricted to four directions such as the horizontal and vertical directions.

According to the present invention, the difference is provided in the features to be extracted as shown in FIGS. 9(a)-9(b) and FIGS. 10(a)-10(b) according to the present system, and may be recognized correctly even for letters such as "┼", "┼" which are difficult to recognize correctly in the conventional system.

Although the present invention has been fully described by way of example with reference to the accompanying drawings, it is to be noted here that various changes and modifications will be apparent to those skilled in the art. Therefore, unless otherwise such changes and modifications otherwise depart from the scope of the present invention, they should be construed as being included therein.

What is claimed is:

1. A character recognition apparatus comprising: a picture image input portion for inputting picture images including recognition object characters; a picture image memory portion for storing said inputted picture images; a character extracting portion for extracting a recognition object character region from said picture image memory portion; a direction code designating portion for designating a direction code of a picture element point of said recognition object character region through its relationship with picture element points adjacent to said picture element point; a direction density calculating portion for obtaining, for each direction code, the number of picture element portions having the same direction code using the information of the direction code for each of said picture element points designated by said direction code designating portion; a change point detection portion for detecting, as at least one change point, a picture element point to be changed from a background portion to a character portion at all times of scanning which is directed from at least one end portion of the recognition object character region to the other end portion thereof and is done in lines on the whole portion of the recognition object character region, and for sequentially ranking the detected change points in order from near said one end portion at every line of the scanning; a background density calculating portion for obtaining, for each group of ranked change points, the number of picture elements from said one end portion or the n−1st change point to the nth change point wherein n is an integer which is equal to or greater than 1; and a recognition portion for extracting a candidate character using the number of picture element points obtained by said direction density calculating portion and the number of picture elements obtained by said background density calculating portion.

2. A character recognition apparatus comprising: a picture image input portion for inputting picture images including recognition object characters; a picture image memory portion for storing said inputted input images; a character extracting portion for extracting a recognition object character region from said picture image memory portion; a direction code designating portion for designating a direction code of a picture element point of said recognition object character region through its relationship with picture element points adjacent to said picture element point; a direction density calculating portion for dividing said region extracted by said character extracting portion into a first plurality of sub-regions to obtain, for each direction code, the number of picture element portions each to be included in each of said sub-regions with the same direction code using the information of the direction code for each of said picture element points designated by said direction code designating portion; a change point detection portion for detecting, as at least one change point, a picture element point to be changed from a background portion to a character portion at all times of scanning which is directed from at least one end portion of the recognition object character region to the other end portion thereof and is done in lines on the whole portion of the recognition object character region, and for sequentially ranking the detected change points in order from near said one end portion at every line of the scanning; a background density calculating portion for dividing said region extracted by said character extracting portion into a second plurality of sub-regions to obtain, for each group of ranked change points, the number of picture elements from said one end portion or the n−1st change point to the nth change point for each of said sub-regions, wherein n is an integer which is equal to or greater than 1; and a recognition portion for extracting a candidate character using the number of picture element points obtained by said direction density calculating portion for each of said regions and the number of picture elements obtained by said background density calculating portion for each of said regions.

3. A character recognition apparatus in accordance with claim 2, wherein said first sub-regions of said direction density calculating portion for each of said regions and said second sub-regions of said background density calculating portion for each of said regions are the same divided regions.

4. A character recognition apparatus in accordance with claim 2, wherein a recognition object character region to be extracted by said character extracting portion is rectangular in shape.

5. A character recognition apparatus in accordance with claim 2, wherein said recognition object character region extracted by said character extracting portion is divided in its horizontal or vertical direction to respectively determine said first sub-regions of said direction density calculating portion for each of said regions and said second sub-regions of said background density calculating portion for each of said regions.

6. A character recognition apparatus in accordance with claim 2, wherein a picture element point is considered a boundary point to obtain a direction code in said boundary point when the polarity of a picture element point of a character pattern of said recognition object character region is different from the polarity of at least one picture element point selected from among said picture element points which are adjacent to said picture element point.

7. A character recognition apparatus in accordance with claim 2, wherein a change point detection portion scans a recognition object character region from four directions which include: a direction from left to right, a direction from top to bottom, a direction from right to left, and a direction from bottom to top, so as to detect said change point and sequentially ranks the detected change points in order from closer to the start end portion of said four directions.

8. A character recognition apparatus comprising: a picture image input portion for inputting picture images including recognition object characters; a picture image memory portion for storing said inputted picture images; a character extracting portion for extracting a recognition object character region having a rectangular shape from said picture image memory portion; a direction code designating portion for designating a picture element point as a boundary point when the polarity of a picture element point of a character pattern of said recognition object character region is different from the polarity of at least one picture element point selected from among eight picture element points adjacent to said picture element point, and for designating a direction code of said boundary point through its relationship with eight picture element points adjacent to said boundary point; a profile direction density calculating portion for obtaining, for each direction code, the number of boundary points having the same direction code using the information of the direction code for each of said boundary points designated by the direction code designating portion for each sub-region, wherein a region extracted by said character extracting portion is M-divided in a horizontal direction, and is N-divided in a vertical direction; a change point detection portion for detecting, as at least one change point, a picture element point to be changed from background portion to a character portion at all times of scanning which is directed from at least one end portion of the recognition object character region to the other end portion thereof in four directions including a direction from right to left, a direction from bottom to top and vice versa and is done in lines on the whole portion of the recognition object character region, and for sequentially ranking the detected change points in order from near said one end portion at every line of the scanning; a background density calculating portion for obtaining, for each group of ranked change points, the number of picture elements from the start end portion or the n−1st change point to the nth change point for each of said sub-regions, wherein n is an integer which is equal to or greater than 1, wherein a region extracted by said character extracting portion is M-divided in said horizontal direction, and is N-divided in said vertical direction; and a recognition portion for extracting a candidate character using the number of picture element points obtained by said profile direction density calculating portion for each of said regions and the number of picture elements obtained by said background density calculating portion for each of said regions.

* * * * *